United States Patent [19]

Eves, II

[11] Patent Number: 4,981,627
[45] Date of Patent: Jan. 1, 1991

[54] METHOD FOR CLOSURE HEATING

[75] Inventor: E. Eugene Eves, II, Westford, Mass.

[73] Assignee: Raytheon Company, Lexington, Mass.

[21] Appl. No.: 389,438

[22] Filed: Aug. 4, 1989

[51] Int. Cl.⁵ .............................................. B29C 35/12
[52] U.S. Cl. ............................. 264/26; 219/10.55 A; 219/10.55 M; 264/268; 264/310; 264/DIG. 46; 425/174.8 R
[58] Field of Search ................... 264/25, 26, DIG. 45, 264/DIG. 46, 310, 268; 425/174.8 R, 174.4; 219/10.55 A, 10.55 M

[56] References Cited

U.S. PATENT DOCUMENTS

| | | | |
|---|---|---|---|
| 3,519,517 | 7/1970 | Dench | 264/26 |
| 3,963,845 | 6/1976 | Dukess | 264/26 |
| 4,104,098 | 8/1978 | Hush et al. | 219/10.55 A |
| 4,163,140 | 7/1979 | Bardet | 264/25 |
| 4,304,744 | 12/1981 | Stroud | 264/25 |
| 4,423,191 | 12/1983 | Haven et al. | 264/26 |
| 4,568,262 | 2/1986 | Feurer | 425/174.4 |
| 4,577,078 | 3/1986 | Noda et al. | 264/25 |
| 4,675,139 | 6/1987 | Kehe et al. | 264/26 |
| 4,731,513 | 3/1988 | Collette | 264/25 |

FOREIGN PATENT DOCUMENTS 1208018 10/1970 United Kingdom .................. 264/25

Primary Examiner—Jeffery Thurlow
Attorney, Agent, or Firm—William R. Clark; Richard M. Sharkansky

[57] ABSTRACT

A method and appaatus for curing a gasket material on a cap, the apparatus having a microwave transmitter, associated wavegide and a device for moving multiple caps through the waveguide. A plastic material is applied to the cap so as to form a gasket. The cap is then moved through the waveguide where microwave energy is absorbed by plastic material. The plastic material then heats from room temperature to a predetermined curing temperature in the waveguide. The cap is then removed and allowed to cool back to room temperature so that the gasket material will harden.

9 Claims, 4 Drawing Sheets

METHOD FOR CLOSURE HEATING

BACKGROUND OF THE INVENTION

This invention relates to microwave energy curing of material and more particularly to hardening gasket material for closures used, together with a jar, to ensure package and material integrity within the jar.

It is known in the art that perishable material, such as food, is preserved in jars by using a closure comprising a cap and cap gasket to enclose the perishables within the jar. More specifically, during processing, food is placed in a jar. The air within the jar is then evacuated. Next a cap, with a cap gasket, is screwed onto the jar. Caps are typically made from a hardened plastic such as polypropylene. Hardened plastic caps do not seal to glass jars well enough to prevent the outside air from re-entering into the jar. Accordingly, in some applications, a cap gasket material that does seal to the jar is implanted in a groove formed on the inside of the top of the cap. When such a cap is placed on the jar, the cap gasket material will mold to the shape of the jar.

One such cap gasket material is a combination of a vinyl chloride polymer such as PVC powder and a plasticizer that is a member of the phthalate family, such cap gasket material comes in a liquid form. The cap gasket material is first placed in the groove and is then cured by being heated to a 340° F. temperature. After such heating, the cap is cooled to room temperature, more specifically a closure of such type is constructed by the following steps (more detail of this process is explained in U.S. Pat. No. 4,309,744): First, the liquid cap gasket material is injected into a groove on the inside of the top of the cap. Second, the cap and cap gasket are pre-heated in a conventional heating oven to 300° F. Third, the cap gasket, which absorbs microwave energy, and cap are then placed in a 10 kilowatt multi-mode industrial microwave oven and heated until the cap gasket material reaches a curing temperature of 340° F. The cap itself is essentially transparent to microwave energy. Thus, the cap itself remains relatively cool because it does not absorb microwave energy. After the cap gasket material reaches curing temperature by the absorption of microwave energy, the closure is then removed from the microwave oven and allowed to cool, at which time the cap gasket material will harden.

The purpose of the pre-heating step is to prevent temperature gradients from developing within the cap gasket material. That is, if the cap and cap gasket material were inserted into the multi-mode oven at room temperature, as the gasket material absorbed energy to reach 340° F., the cap, being non-absorptive to the energy, would act as a heat sink for the energy absorbed by the gasket material. Thus, the portion of the gasket material on, or adjacent to, the cap would be cooler relative to the portion of the gasket material furthest from contact with the cap. Thus, a temperature gradient would be developed across the gasket material. Temperature gradients may cause uneven hardening in the cap gasket material. Further, if the temperature in the cap gasket material becomes too hot, it may scorch, which results in the cap gasket material turning brown. If the temperature in the cap gasket material does not reach 340° F., the cap gasket material will not cure and accordingly will remain liquid. If the closure is heated too long, the cap may melt and become distorted.

It is desirable, however, to eliminate the pre-heat step. One drawback of preheating is that the preheat oven requires a large amount of floor space. Further, preheating is an additional process step. Another drawback of preheating is that caps side walls may have a thin cross-sectional area that will deform if pre-heated.

Another drawback in using a multi-mode oven is that because it may not always be known how many closures are in process at any given time and because as closures absorb a percentage of the surrounding microwave energy, the requisite processing time may vary from load size to load size. This variation complicates the microwave oven processing procedure by requiring heating parameters to be constantly changed with load variations.

When processing many closures simultaneously, a large amount of floor space may be required to accomplish preheating. A multi-mode microwave oven may require 100–200 square feet of floor space. However, in a production environment, available floor space is typically very limited.

Finally, continuously processing closures having a height greater than 1½" in a multi-mode microwave oven may not readily be accomplished without requiring elaborate choking structures to reduce leakage of microwave energy.

SUMMARY OF THE INVENTION

An object of the present invention is to provide an improved method and apparatus for processing closures.

It is also an object of the present invention to provide a method for uniformly curing cap gasket material.

It is further an object of the present invention to provide an apparatus that continuously cures the cap gasket material for many closures simultaneously.

Another object of the present invention is to provide an apparatus to process closures in a microwave or radio frequency oven without requiring a pre-heating of caps and gasket material.

An additional object of the invention is to provide a microwave heating apparatus that processes closures of various heights without requiring elaborate leakage supression chokes.

A further object of the present invention is to provide an apparatus for curing cap gasket material with reduced floor space requirements.

These and other objects are accomplished by an apparatus for curing a closure coupling a cap and a gasket material disposed thereon comprising: a single mode radio frequency waveguide; means for transmitting radio energy into the waveguide; and, means introducing cap and gasket material therein into the waveguide at room temperature for moving the cap and gasket material through the waveguide to selectively heat the cap gasket material to a predetermined curing temperature and for removing the cap and gasket material therein from the waveguide to return the gasket material to room temperature and cure the gasket material. By having a single mode radio frequency waveguide, a uniform radio frequency field develops within the waveguide so that the temperature of gasket material on the cap is relatively uniform when heated from room temperature to the curing temperature when passed through the waveguide.

It is a preferred embodiment that the apparatus include a waveguide termination structure having impedance match the output impedance of the waveguide so that the termination structure absorbs substantially all of the microwave energy transmitted into the waveguide and not absorbed by the gasket material.

It is a further feature of the invention that the closures be rotated while moving through the waveguide. The rotation will uniformly cure the gasket material on the cap. It is additionally preferable that the waveguide be substantially vertically positioned so that the apparatus will reduce the amount of floor space required to heat gasket material by having the caps move vertically rather than horizontally. It is additionally preferable that the microwave or radio frequency energy have a preset operating wavelength and that the waveguide have a first and second opening wherein the caps are introduced into the waveguide through the first opening and removed from the waveguide through the second opening. The size of the openings are preferably less than ½ of the preset operating wavelength so that the apparatus will allow closures to enter and exit through the waveguide without elaborate choking structures.

The apparatus also comprises means for moving the cap into the first aperture, by a belt extended through the waveguide to transport closures into the waveguide without interfering with the transmission of microwave or radio frequency energy into the waveguide.

In accordance with an additional feature of the invention, the apparatus includes means for introducing a predetermined amount of microwave power into the waveguide. This amount of such power is several orders of magnitude greater than the amount of energy expected to be absorbed by the maximum amount of closures being processed in the waveguide at a predetermined processing interval. Thus, if the load is varied from the maximum load, the processing time need not be varied.

The invention may also be practiced by the method of curing plastic material comprising the step of positioning the plastic material at room temperature into a single mode waveguide energized with radio frequency energy so as to heat the plastic material to a predetermined curing temperature. It may be preferable that the method include the step of removing the heated plastic material from the waveguide to return the plastic material to room temperature.

The invention may further be practiced by the method of curing gasket material on a cap to make a closure comprising the step of positioning the cap with the gasket material at room temperature into a single mode waveguide energized with radio frequency or microwave frequency energy so as to heat the gasket material to a predetermined curing temperature. It may be preferable that the method further comprise the step of removing the heated gasket material from the waveguide to return the temperature of the gasket material to room temperature to cure the gasket material. Alternately, the method may comprise the steps of moving the cap through the waveguide when the gasket material is heated and rotating the cap as it moves through the waveguide.

DESCRIPTION OF THE PREFERRED EMBODIMENTS

Figure 1:
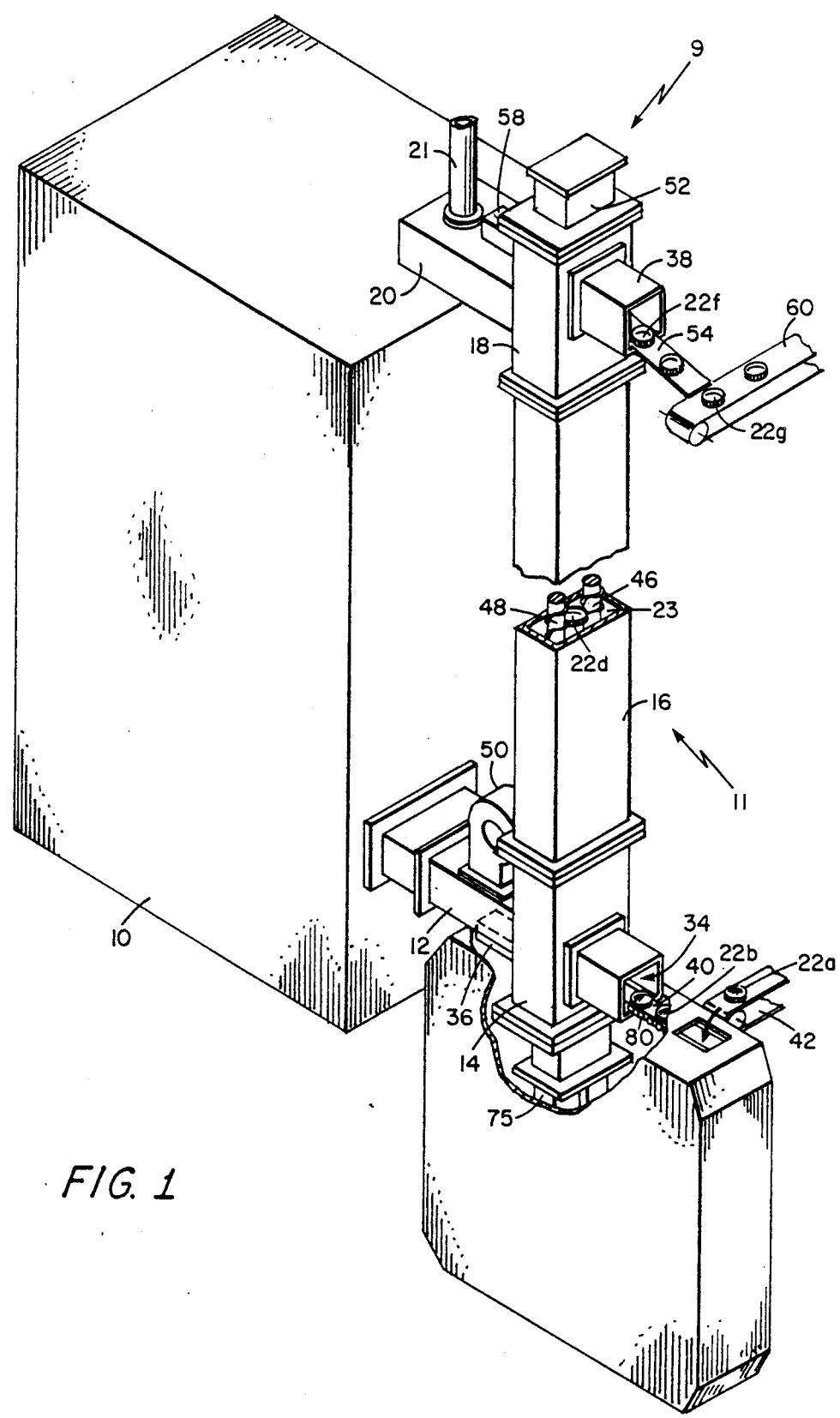
FIG. 1 shows a sectioned perspective view of the device for heating closures.

Referring to FIG. 1, there is shown an apparatus 9 for curing a closure made up of a cap and gasket material, such apparatus 9 includes a microwave frequency transmitter 10 (300 MHz-300 GHz) or any radio frequency (approximately 20 KHz-300 GHz) transmitter connected to a waveguide structure 11. Waveguide structure 11 has a straight waveguide section 12 attached to the lower portion 14 of a vertical main, rectangular cross-section waveguide section 16. Attached at the upper portion 18 of the vertical main waveguide section 16 is a straight waveguide section 20 having a water load 21 at its far end. Within main waveguide section 16 is single mode waveguide cavity 23.

Figure 2:
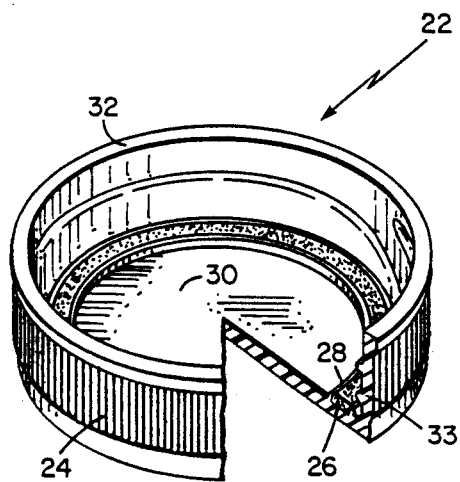
FIG. 2 shows a sectioned top perspective view of a closure.

Referring to FIG. 2, there is shown a closure 22 having a cap 24 with a gasket material 26 typically embedded within a groove 28 formed on the cap's end panel 30. Caps 24 can vary in height and shape and ordinarily have a ridge 32 and a skirt 33. Cap 24 will preferably have a height of less than 4 inches and a diameter also less than 4 inches. The cap 24 is typically made from a hardened plastic, such as polypropylene material. The gasket material 26 is also made from a plastic material such as Polyvinyl Chloride (PVC) powder and another plastic material that plasticizes PVC and may be a member of the phthalate family. Gasket material 26 is highly absorptive of microwave energy (i.e. it has material properties that absorb microwave energy and cause it to heat up in a microwave field) relative to the microwave energy absorptivity of the cap material (which has a small conductivity and is essentially transparent to microwave energy). The gasket material 26 thermal conductivity may be increased by mixing in with it a filler material such as alumina.

Figure 3:
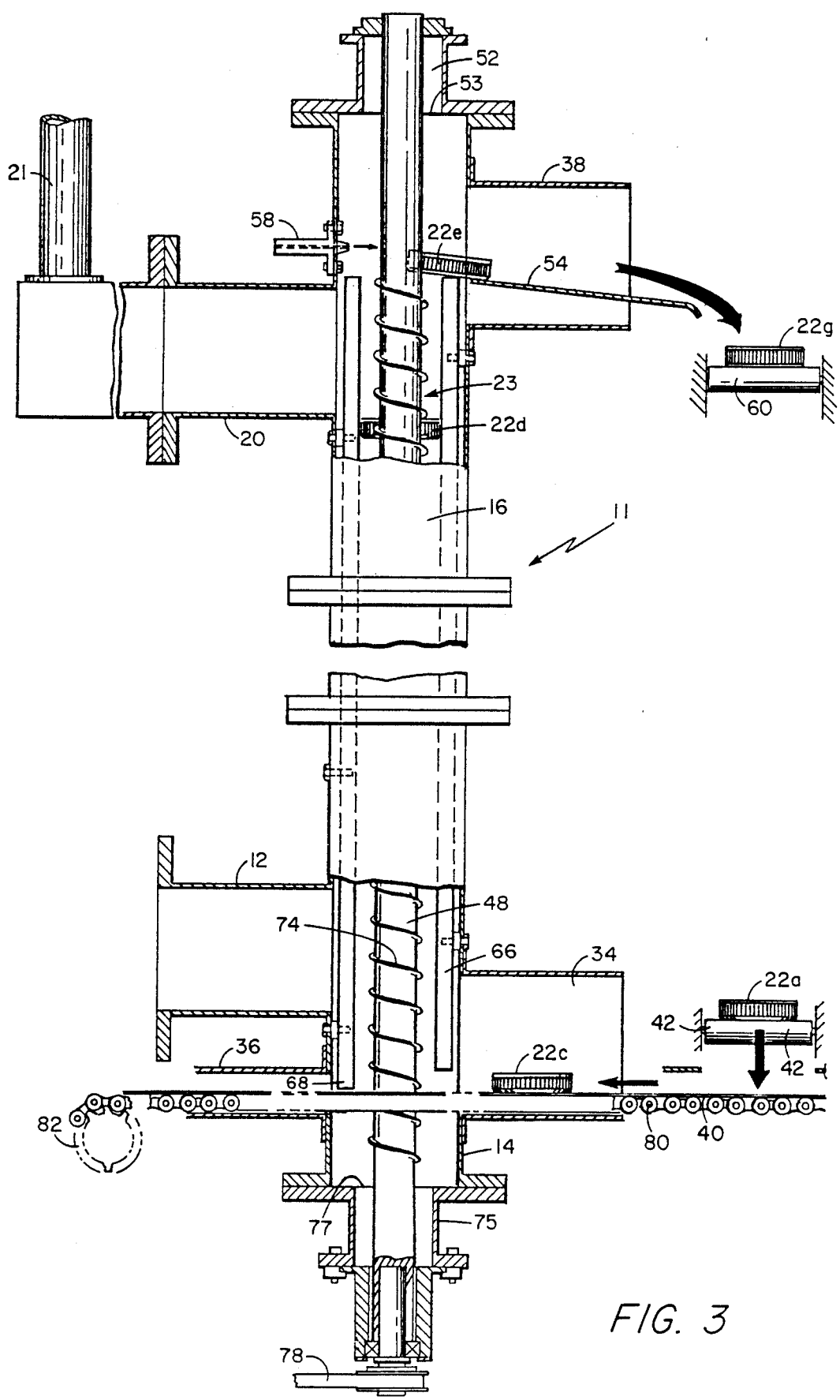
FIG. 3 shows a side sectioned view of the device shown in FIG. 1.

Referring to FIGS. 1 and 3, there is shown a vertical main waveguide section 16 preferably constructed with a WR 975 guide tubing having a total length of approximately 8.0 feet. WR 975 guide has a width dimension that is twice its height dimension. The vertical main waveguide section 16 is constructed to operate in a $TE_{10}$ mode. Disposed on the opposite side of vertical main waveguide section 16 across from straight waveguide section 12 is feed inlet section 34. Across main waveguide section 16 from feed inlet section 34 is chain outlet section 36. The floor of both feed inlet section 34 and chain outlet section 36 is disposed below the level where straight waveguide section 12 mates with main waveguide section 16.

Across from straight waveguide section 20, connected to main waveguide section 16, is feed outlet section 38. The height of feed outlet section 38, feed inlet section 34 and chain outlet section 36 are less than ½ wavelength of the free space operating wavelength of the microwave energy used by the apparatus 9 to prevent microwave energy from leaking out of feed inlet section 34, chain outlet section 36 and feed outlet section 38. As is well known, microwave energy will not propagate through openings having a width and height less than ½ its wavelength. Hence, since the free space operating wavelength is approximately 13" inches, this feed structure allows 4" caps to pass into main waveguide section 16 without requiring complicated choking structures. The distance between feed inlet section 34 and feed outlet section 38 is approximately 6.5 feet.

Figure 4:
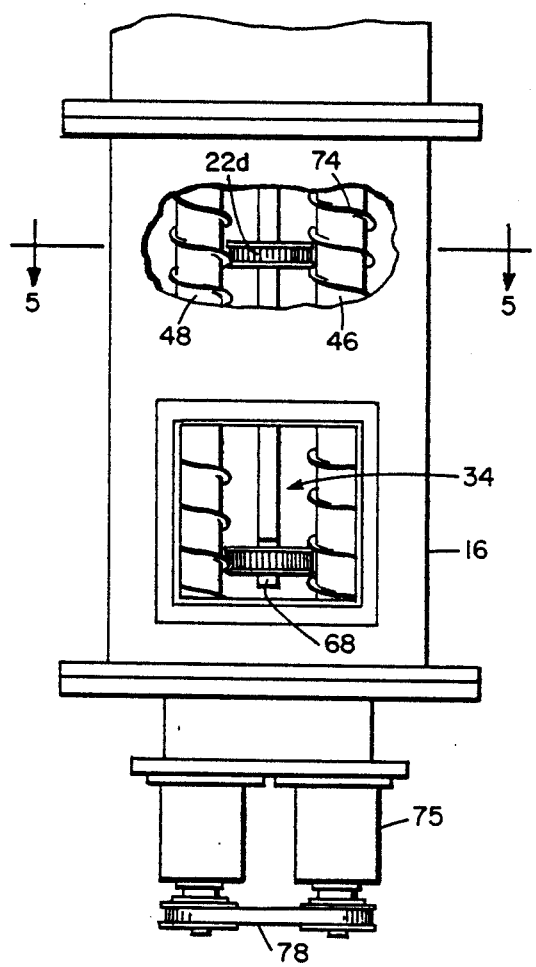
FIG. 4 shows a side sectioned view of the waveguide showing the drive screw operation.

Referring to FIGS. 1, 3 and 4, on the floor of lower portion 14 of main waveguide section 16 is bottom guide structure 75. The top surface 77 (FIG. 3) of bottom guide structure 75 is located ¼ wavelength below the center of straight waveguide section 12 resulting in the guide structure 75 appearing as a short circuit. Microwave energy from straight waveguide section 12 propagates up main waveguide section 16 and is not reflected back into straight waveguide section 12. Bottom guide structure 75 supports guide shafts 66 and 68 and drive screws 46 and 48.

Referring to FIGS. 1 and 3, a conveyer belt 40 runs through vertical main waveguide section 16 via feed inlet section 34 and chain outlet section 36. Conveyer belt 40 transports closures 22b (FIG. 1) and 22c (FIG. 3) into main waveguide section 16. Closure 22d is then transported upwards by a pair of drive screws 46 (FIG. 1) and 48. Closures 22a are deposited onto conveyer belt 40 through conveyer 42. It is recognized by placing feed inlet section 34 and chain outlet section 36 below the level of straight waveguide section 12, a conveyer belt 40 can extend through main waveguide section 16 and downward without having to also extend through straight waveguide section 12. Extending a conveyer belt through straight waveguide section 12 can complicate its construction. Referring to FIG. 1, connected to straight waveguide section 12 is blower 50. Blower 50 moves cool air into straight waveguide section 12 and through main waveguide section 16 to keep the air temperature within cavity 23 cool. This cool air prevents drive screws 46 and 48 from melting.

Located at the top of vertical main waveguide section 16 is a guide structure 52 which holds the drive screws 46 and 48 in place during operation. The bottom surface 53 (FIG. 3) of guide structure 52 is located at approximately ½ wavelength above the center of straight waveguide section 20 resulting in guide structure 52 operating as a short circuit. Accordingly, the microwave energy within cavity 23 propagates into straight waveguide section 20 and does not reflect back in main waveguide section 16. Disposed directly below guide structure 52 is feed outlet section 38. Feed outlet section 38 has a maximum height dimension of less than ½ wavelength.

Referring to FIG. 3, within feed outlet section 38 is a ramp 54 sloped at an angle such that closure 22e slides down and out of main waveguide section 16 after closure processing. Across from feed outlet section 38 is a nozzle 58 which forces out closures 56 onto ramp with air pressure.

Referring to FIG. 2, during closure processing operation, gasket material 26 in liquid form is injected into the groove 28.

Referring to FIG. 1, the closure 22 moves at room temperature onto a series of belts 42 and 40 into the waveguide section 16. Next closure 22c moves through the main waveguide section 16. Microwave frequency energy couples into main waveguide section 16, wherein gasket material 26 is heated to a predetermined curing temperature, as noted previously the microwave absorptivity of the gasket material 26 is greater than that of the cap 24 material. Accordingly, the gasket material 26 heats up faster than the cap 24 in the microwave field. The cap 24 heats primarily by conduction from the gasket material 26. The gasket material 26 heats to the predetermined curing temperature. After reaching such temperature, the closure 22c (FIG. 3) then moves out of the main waveguide section 16 down ramp 54 onto other belts 60 where the closure 22g is cooled to room temperature and is transferred for further processing. More details of this curing operation will be explained later.

Disposed across from feed outlet section 38 below air blower 58 is straight waveguide section 20. Within straight waveguide section 20 is water load 21 which absorbs substantially all of the microwave energy that is propagated into main waveguide section 16 from transmitter 10 except for that portion absorbed by the gasket material. The length of straight waveguide section 20 may contain inductive posts or tuning stubs (not shown) to ensure minimal reflection from water load 21.

When microwave energy from transmitter 10 propagates through main waveguide section 16, substantially all of the microwave energy is absorbed by water load 21. More particularly, much less than 1% of the total power available in main waveguide section 16 is absorbed in any individual closure such as closure 22d. For example, when closure 22 moves through main waveguide section 16 with no other closures in process, that closure moves through a microwave field having 100% of the available power available when it first entered main waveguide. That closure also has 100% of the available power available when it leaves main waveguide. Hence, the average power that a closure is exposed to is 100%. As a closure absorbs much less than 1% (approximately 0.1% for a 50KW field) of the average total power and is moved through the waveguide in approximately 30 seconds, the closure will absorb approximately 1500 joules.

Thus, when a closure moves through main waveguide section 16 in 30 seconds with the maximum number of closures in process (approximately 60), that closure moves through a microwave field having 100% of the available power when it first enters main waveguide section 16. Sixty closures will absorb 6% of the total power in the main waveguide. Hence, a closure moves through a field having 94% of the available power just before it leaves main waveguide. The average power that a closure is exposed to is 97%. Accordingly, a closure in a fully loaded system moving through apparatus 9 within 30 seconds will absorb 1455 joules, only 3% less than a system with only one closure in process. It is recognized by having a substantial percentage of microwave energy being absorbed by water load 21, the number of closures within main waveguide section 16 at any given time with a fixed time interval will have little effect on the curing and final temperature of the gasket material 26. In other words, having 1 closure or 60 closures within waveguide during a 30 second microwave exposure will have little effect on the finished closure and its gasket material.

It is preferable that the transmitter 10 transmit between 30 and 50 kilowatts of power at 915 MHz to be able to cure gasket material at a rate of 120 closures per minute; however, more or less power may be used if the main waveguide section 16 is modified slightly, as will be explained later. It is also preferable that a WR 975 type waveguide be used for 915 MHz transmitter frequency. The length of the main waveguide section 16 is constructed to ensure maximum throughput and that each closure remain in the waveguide for the minimum time (see FIG. 6).

The feed inlet section 34 and feed outlet section 38 preferably have a height dimension of less than 4½ inches. It is recognized that this height dimension is dependent on the microwave transmitter frequency. By having the maximum height dimension of feed inlet section 34 and chain outlet section 36 less than ½ wavelength, no special choking structure around feed inlet section 34 or chain outlet section 36 is required.

Figure 5:
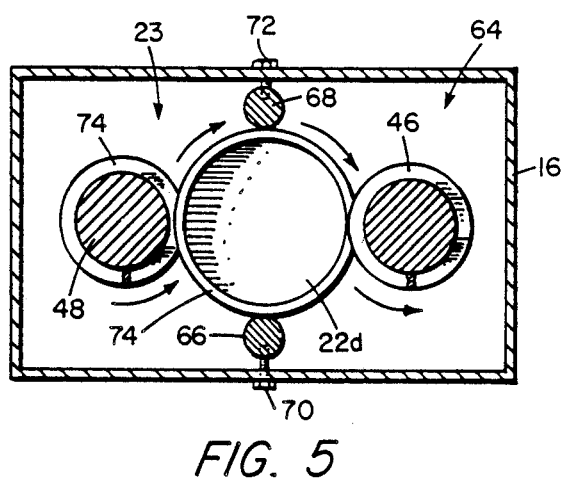
FIG. 5 shows a top sectioned view of the waveguide shown in FIG. 4.

In FIG. 5, there is shown a drive system 64 which transports a closure 22d through the vertical main waveguide section 16. The drive system 64 includes a left drive screw 48 and a right drive screw 46. The drive system 64 also includes a pair of closure guides 66 and 68 which are held in place with mounting screws 70 and 72. Each drive screw 46 and 48 has a helical lip 74 (FIGS. 3, 4 and 5) which rotates around drive screws 46 and 48. The spacing between lips 74 is preferably 1-2 inches.

Referring to FIGS. 3 and 4, located on the bottom of waveguide section 16 is bottom guide structure 75. Bottom guide structure 75 supports drive screws 46 and 48. Closures 22 contain caps 24 that have a ridge 32 which is held in place with lips 74. Optionally, cap 24 may be supported on lips with end panel 30. These caps 24 also have a skirt 33 having an outer diameter less than the ridge 32 outer diameter so that the closure 22 can hang between more than one pair of lips. Lip 74 supports closures (not shown) having taller walls. If taller closures are used, the processing rate must be reduced.

Referring to FIG. 5, the drive screws 46 and 48 rotate counter-clockwise which results in the closure 22d turning clockwise while being pushed upward. It is recognized by turning the closure while moving it through the main waveguide section 16, more uniform curing occurs within the gasket material 26. It is also recognized by not turning the closure 22d, the gasket material 26 (FIG. 2) may scorch.

Referring to FIG. 4, the left drive screw 48 and right drive screw 46 are turned by a belt 78 connected to a motor (not shown) that is located below the main waveguide section 16. It is preferable that the left drive screw 48 and right drive screw 46 are connected at their bottom to prevent slippage. It is also preferable that left and right drive screws 48 and 46 have one of their lips 74 properly aligned when the closure 22d is moved upward.

Referring to FIG. 3, various conveyer systems are preferably used to place a closure into the main waveguide section 16. At the bottom of the main waveguide section 16 running through feed inlet section 34 and feed inlet section 36 is conveyer belt 40 which is formed with a microwave transparent chain 80. Chain 80 is placed over a gearing mechanism 82 that is connected to motor (not shown) to move closures. Conveyer 42 places closure 22a onto belt 40. Belt 40 moves closures 22c into main waveguide section 16. Closure 22d then moves through main waveguide section 16, wherein closure 22d gasket material (not shown) is cured. Closure 22e containing cured gasket material moves onto ramp 54. Below ramp 54 is conveyer 60 which moves closure 22g to another step for further processing.

Referring to FIGS. 3 and 4, during operation, the closure's 22 path is as follows: First, the liquid gasket material 26 is injected into the cap 24. The closure 22 is then put on conveyer 42 at room temperature. The conveyer 42 then deposits the closure 22a onto conveyer 40. Conveyer 40 moves closure 22c through feed inlet section 34 and into vertical main waveguide section 16. The closure 22c is stopped from going through the main waveguide section 16 by closure guide 68. The left and right drive screws 46 and 48 rotate, resulting in the closure 22d rising upward. It is noted that as the closure 22d rises upward, it is held in place with closure guide 66 and closure guide 68, and rotates in a counter-clockwise direction (see FIG. 5). Further, as the closure 22d moves upward through vertical main waveguide section 16, the gasket material 26 temperature rises, as does the temperature of the cap 24 until the gasket material 26 exceeds the curing temperature. At that time, the closure 22e will reach the top of vertical main waveguide section 16. A blower, or alternately a tapping device, or equivalent, moves the closure 22e onto ramp 54 and then downward onto belt 60 to return the gasket material to room temperature. The gasket material will harden when cooled to room temperature. The closure 22g then moves to the next step in the process.

It is recognized that with the disclosed embodiment, 120 closures per minute may be processed. It is noted that other embodiments may also be constructed having wider distances between lips, taller main waveguides, different waveguide shapes with a corresponding microwave frequency (other than 915 MHZ) to change the processing rate, maximum cap heights or cap shape. It is also recognized that the closure 22 is moved through waveguide structure 11 at a rate to prevent gradients and scorching from developing in the gasket material 26. The closure 22 moves through main waveguide section 16 at a fast enough rate so that the cap 24 does not heat by conduction from the gasket 26 to such an extreme temperature that closure 22 becomes distorted.

The preferred embodiment has a water load termination 21 which absorbs substantially all of the microwave energy generated by the transmitter 10. However, it may also be preferable that the water load 21 (or other load) be located within the transmitter and the far end of the vertical main waveguide be constructed so as to reflect all of the microwave energy transmitted into the main waveguide section 16. This approach will permit each closure to absorb twice the power as a non-reflecting waveguide; however, the variation in the power going to each closure 22 will be more susceptible to non-uniformities in main waveguide section 16 due to varying numbers of closures in the vertical main waveguide section 16. If this approach is taken, a three port microwave circulator would be located in the transmitter. The load would be coupled to one port of the circulator, the microwave source would be coupled to the second port and the waveguide applicator would be coupled to the third port.

It may also be preferable that another approach be taken having one or more waveguides connected to the first waveguide structure 11. These waveguide structures would be substantially identical and would be connected so that several waveguide structures may process caps simultaneously. This additional waveguide structure will be positioned such that the microwave energy from the first waveguide structure enters the additional waveguide structure through the location where the water load 21 is located on the shown embodiment (FIG. 1). At the location of where transmitter 10 is located on the first waveguide structure on the additional waveguide structure would be a water load which would absorb substantially of the microwave energy flowing through first and additional waveguide structures. The advantage of this approach is that twice or more caps may be processed simultaneously using the same transmitter 10.

Figure 6:
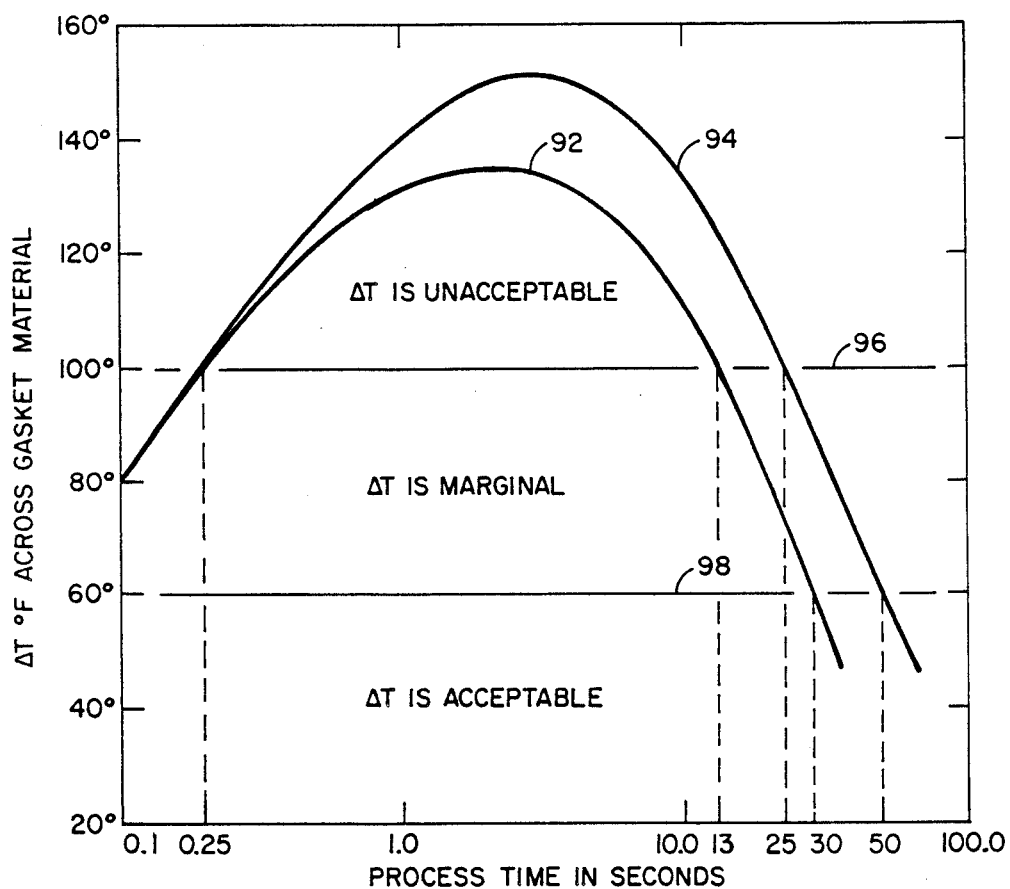
FIG. 6 shows a graph of the heating characteristics of the closure and gasket material.

Referring to FIG. 6, there is shown a plot of the temperature differential ($\Delta T$) from the top to bottom of gasketing material 26 within a closure 22 as a function of the constant power process time using a gasket material having either standard degree of thermal conductivity, (line 94) or higher degree as by adding alumina powder (line 92). The process times given were for gasket material 26 having a thickness of 1/32 inches, reaching curing temperature (approximately 425° F.) from room temperature (80° F.). The process time is a function of the dielectric absorptivity of the gasket material 26, the heat transfer characteristics of cap 24 and the surface cooling rate of the gasket material 26 due to surrounding air.

Line 96 is the threshold where the temperature differential ($\Delta T$) between the top and bottom of the gasket material 26 is too high. The high temperature differential may cause scorching in the gasket material 26.

Below line 98 is the region where the gasket material temperature differential ($\Delta T$) is acceptable. In this region, the gasket material 26 will cure evenly. Therefore, standard gasket material, the desired process time is 50 seconds (line 94) and for high conductivity gasket material, the process time will be approximately 30 seconds (line 92).

Between line 96 and line 98 is the region where the gasket material 26 temperature differential ($\Delta T$) at curing temperature is marginal. In this region, a few of the processed closure's 22 gasket material 26 will have scorchings as well as a few of the closure's gasket material may not be cured. The processing time for a closure 22 to fall in this region is either less than 0.25 seconds or greater than 25 seconds for standard conductivity gasket material (line 94) and greater than 13 seconds for high conductivity gasket material (line 92). Accordingly, the closure may be processed in as quick as 13 seconds for high conductivity gasket material and as quick as 25 seconds for standard conductivity gasket material.

Accordingly, the closures should be transported through the main waveguide section 16 at a rate that will result in the gasket material reaching curing temperature with minimal scorching or distortion. It is recognized that moving a closure 22 through the main waveguide section 16 in 30 seconds under constant power will cure gasket material 26 with the acceptable limits. This rate will allow 120 one inch closures to be processed in one minute.

This concludes the Description of the Preferred Embodiments. A reading of those skilled in the art will bring to mind many modifications and alternatives without departing from the spirit and scope of the invention. Accordingly, it is intended that the invention only be limited by the following claims.

What is claimed is:

1. The method of forming a sealing gasket on each of a plurality of caps each made of a microwave transparent material, comprising the steps of:
   providing a microwave waveguide section having a microwave feed inlet adjacent one end and a microwave absorbing load outlet adjacent the opposite end;
   feeding microwave energy at a predetermined power level through said microwave feed inlet along said waveguide section and out said outlet to said microwave absorbing load;
   depositing a microwave absorptive gasket material on each of said plurality of caps;
   introducing said plurality of caps at room temperature into said waveguide section and conveying said caps through and then out of said waveguide section wherein each of said caps is exposed to said microwave energy in said waveguide section for a period of 30 seconds or greater, said predetermined microwave energy power level being of such magnitude that the gasket material on said caps is heated to a predetermined curing temperature by exposure to said microwave energy for said period of 30 seconds or greater, and the maximum temperature differential within said gasket material is less than 60° F.; and
   cooling said gasket material after being conveyed out of said waveguide section.

2. The method recited in claim 1 wherein said microwave waveguide section is vertically oriented.

3. The method recited in claim 1 wherein substantially less than 1% of the available microwave energy in said waveguide section is absorbed by any one of said caps and the gasket material deposited thereon.

4. The method recited in claim 3 wherein approximately 0.1% of the available microwave energy in said waveguide section is absorbed by said any one cap and the gasket material deposited thereon.

5. The method recited in claim 3 wherein approximately 94% or more of said microwave energy is absorbed by said absorbing load.

6. The method recited in claim 1 wherein said load comprises water.

7. The method recited in claim 2 wherein said caps are conveyed upwardly in said waveguide.

8. The method recited in claim 7 wherein said caps are rotated while being conveyed upwardly in said waveguide.

9. The method recited in claim 1 wherein said curing temperature is approximately 425° F.

* * * * *